US008047809B2

(12) United States Patent
Wickert et al.

(10) Patent No.: US 8,047,809 B2
(45) Date of Patent: Nov. 1, 2011

(54) MODULAR AIR COMPRESSION APPARATUS WITH SEPARATE PLATFORM ARRANGEMENT

(75) Inventors: Thomas Edward Wickert, Simpsonville, SC (US); Mark Stewart Schroder, Greenville, SC (US)

(73) Assignee: General Electric Company, Schenectady, NY (US)

( * ) Notice: Subject to any disclaimer, the term of this patent is extended or adjusted under 35 U.S.C. 154(b) by 977 days.

(21) Appl. No.: 11/742,195

(22) Filed: Apr. 30, 2007

(65) Prior Publication Data

US 2008/0264061 A1 Oct. 30, 2008

(51) Int. Cl.
*F04B 23/04* (2006.01)
*F04B 25/00* (2006.01)
*F16M 9/00* (2006.01)

(52) U.S. Cl. ......................... 417/244; 417/243; 248/639

(58) Field of Classification Search .................. 417/243, 417/244, 266, 234; 248/639; 137/356, 357, 137/362, 363

See application file for complete search history.

(56) References Cited

U.S. PATENT DOCUMENTS 1,418,202 A * 5/1922 Parsons .......................... 417/243
1,898,729 A * 2/1933 Huguenin ...................... 417/243
2,227,532 A * 1/1941 Cave, Jr. .......................... 417/24
2,256,654 A * 9/1941 Spurgeon et al. ............. 417/234
2,458,284 A * 1/1949 Metzgar ......................... 417/228
2,954,918 A * 10/1960 Mueller ......................... 417/343
3,391,642 A * 7/1968 Vymola ......................... 417/244
3,736,074 A * 5/1973 Kilbane et al. ................ 417/279
4,097,202 A * 6/1978 Price ............................. 417/454
4,638,971 A * 1/1987 Basinsky et al. .............. 248/678
4,693,669 A 9/1987 Rogers, Sr.
5,282,726 A * 2/1994 Warren .......................... 417/243
5,626,468 A * 5/1997 Muir et al. ..................... 417/360
5,899,669 A * 5/1999 Van Grimberge ............. 417/243
5,980,218 A * 11/1999 Takahashi et al. ............ 417/243
6,058,695 A 5/2000 Ranasinghe et al.
6,117,916 A 9/2000 Allam et al.
6,308,512 B1 10/2001 Kopko
6,328,024 B1 12/2001 Kibort
6,360,731 B1 * 3/2002 Chang ........................ 123/559.1
6,484,508 B2 11/2002 Rocklin et al.
6,530,224 B1 3/2003 Conchieri
6,672,062 B2 1/2004 Shaffer
6,880,343 B2 4/2005 Kopko
6,938,404 B2 9/2005 Awdalla
7,065,953 B1 6/2006 Kopko
2004/0018093 A1 * 1/2004 Schmid et al. .................... 417/2
2006/0177302 A1 8/2006 Berry
2006/0218921 A1 10/2006 Sumser
2010/0329895 A1 * 12/2010 Baker et al. .................. 417/243

OTHER PUBLICATIONS

USDOE, "Energy Tips—Steam," Jan. 2006.*

* cited by examiner

*Primary Examiner* — Charles Freay
*Assistant Examiner* — Nathan Zollinger
(74) *Attorney, Agent, or Firm* — Armstrong Teasdale LLP

(57) ABSTRACT

A method of assembling a fluid compression system includes coupling at least one first compression apparatus to a first platform. The method also includes coupling at least one drive apparatus to one of the first platform and a second platform. The method further includes coupling the first platform to the second platform. The at least one second compression apparatus is coupled in series flow communication with the at least one first compression apparatus.

15 Claims, 3 Drawing Sheets

MODULAR AIR COMPRESSION APPARATUS WITH SEPARATE PLATFORM ARRANGEMENT

BACKGROUND OF THE INVENTION

The present invention relates generally to gas compression systems, and more particularly, to methods and systems for supplying compressed air for industrial facilities.

At least some known industrial facilities include air compression systems that include compression devices that are coupled in flow communication in compression trains that enable air to be compressed in predetermined sequences. At least some of the known air compression devices include axial and centrifugal compressors. Additional support equipment for known air compression systems may include filters and filter housings, superchargers, flow control vanes, and/or coolers coupled in flow communication with the compressors via piping and/or ductwork configured for the associated air pressures and flow rates. Moreover, the systems typically include turbine engine and/or electric motor drives coupled to the compressors.

Known air compression trains generally compress air in smaller volumes than is used by the industrial facilities, thereby necessitating the use of a plurality of trains. However, increasing the number of trains increases the footprint of the system, as well as the number of components, such that capital procurement costs and operational and maintenance costs are increased. Moreover, increasing the number of components typically increases manufacturing lag times and capital installation costs. In addition, some known systems are oriented in vertical configurations, which requires additional capital procurement and constructions costs for an associated building or structure.

BRIEF DESCRIPTION OF THE INVENTION

In one aspect, a method of assembling a modular compression system is provided. The method includes coupling at least one first compression apparatus to a first platform. The method also includes coupling at least one drive apparatus to one of the first platform and a second platform. The method further includes coupling the first platform to the second platform.

In another aspect, a modular compression system is provided. The system includes at least one first compression apparatus coupled to a first platform. The system also includes at least one second compression apparatus coupled to a second platform. The at least one second compression apparatus is coupled in series flow communication with the at least one first compression apparatus.

In a further aspect, an industrial facility is provided. The facility includes at least one compressed gas receiving apparatus. The facility also includes at least one modular compression system coupled in series flow communication with the at least one compressed gas receiving apparatus. The at least one air compression system includes at least one first compression apparatus coupled to a first platform. The system also includes at least one second compression apparatus coupled to a second platform. The at least one second compression apparatus is coupled in series flow communication with the at least one first compression apparatus.

DETAILED DESCRIPTION OF THE INVENTION

Figure 1:
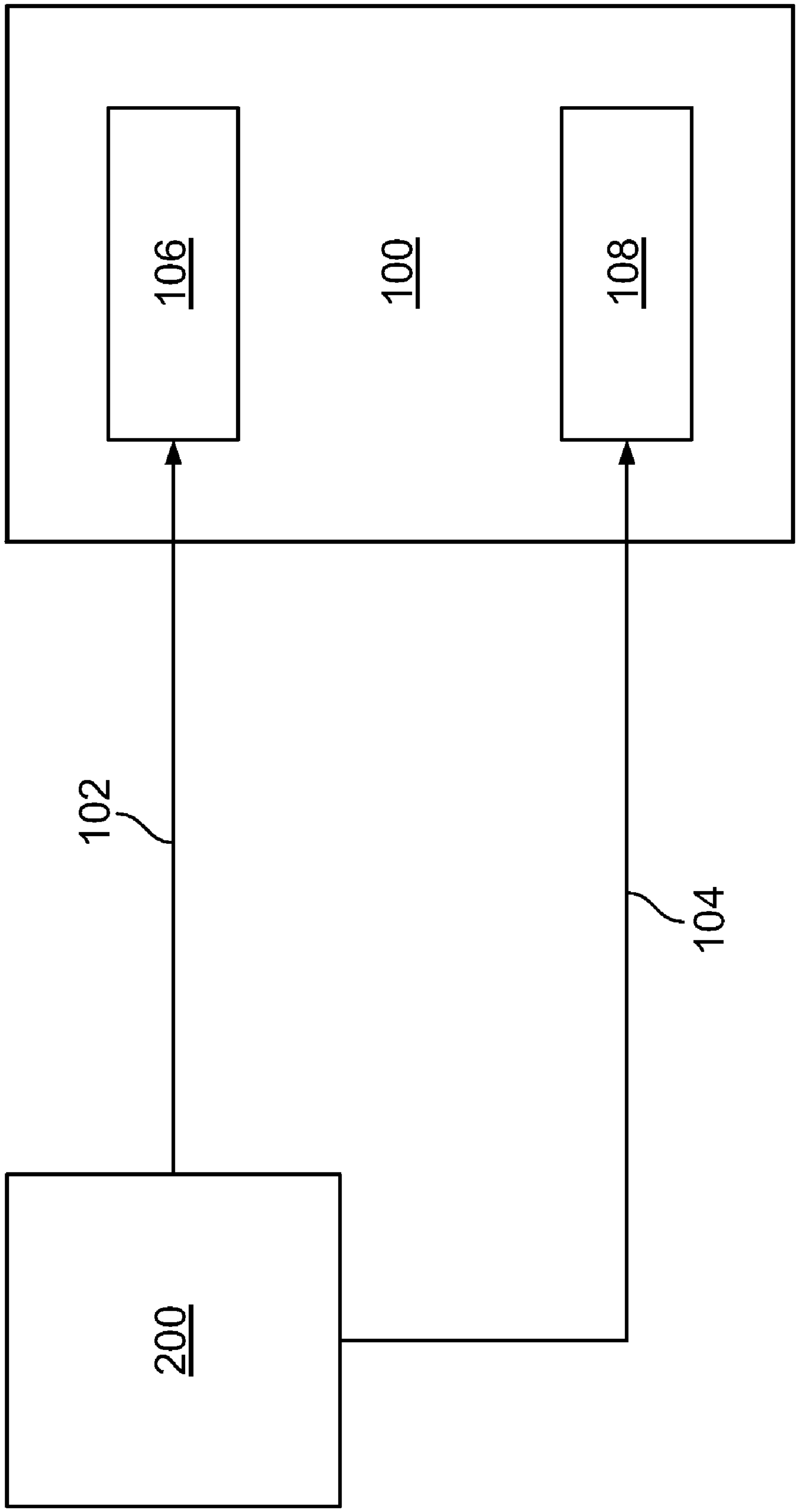
FIG. 1 is a schematic diagram of an exemplary industrial facility.

FIG. 1 is a schematic diagram of an industrial facility 100. Industrial facility 100 is any facility that uses compressed gases, including, but not limited to, food and chemical processing plants, air separation units (including cryogenic and membrane separation types) within integrated gasification combined cycle power plants, manufacturing plants, silo combustors in power generation plants, high temperature/pressure extraction apparatus and compressed gas production plants.

In the exemplary embodiment, industrial facility 100 is coupled in flow communication with a compression system 200 (discussed in more detail below). Specifically, system 200 is coupled in flow communication with facility 100 via two gas supply conduits. More specifically, facility 100 and system 200 are coupled in flow communication via a first air supply conduit 102 and a second air supply conduit 104. System 200 produces a first air stream at a first pressure and a second air stream at a second pressure (neither shown) that are channeled through first air supply conduit 102 and second air supply conduit 104, respectively. In the exemplary embodiment, the second pressure is greater than the first pressure. Alternatively, system 200 produces any number of air streams at any pressures and any flow rates that facilitate operation of facility 100.

Figure 2:
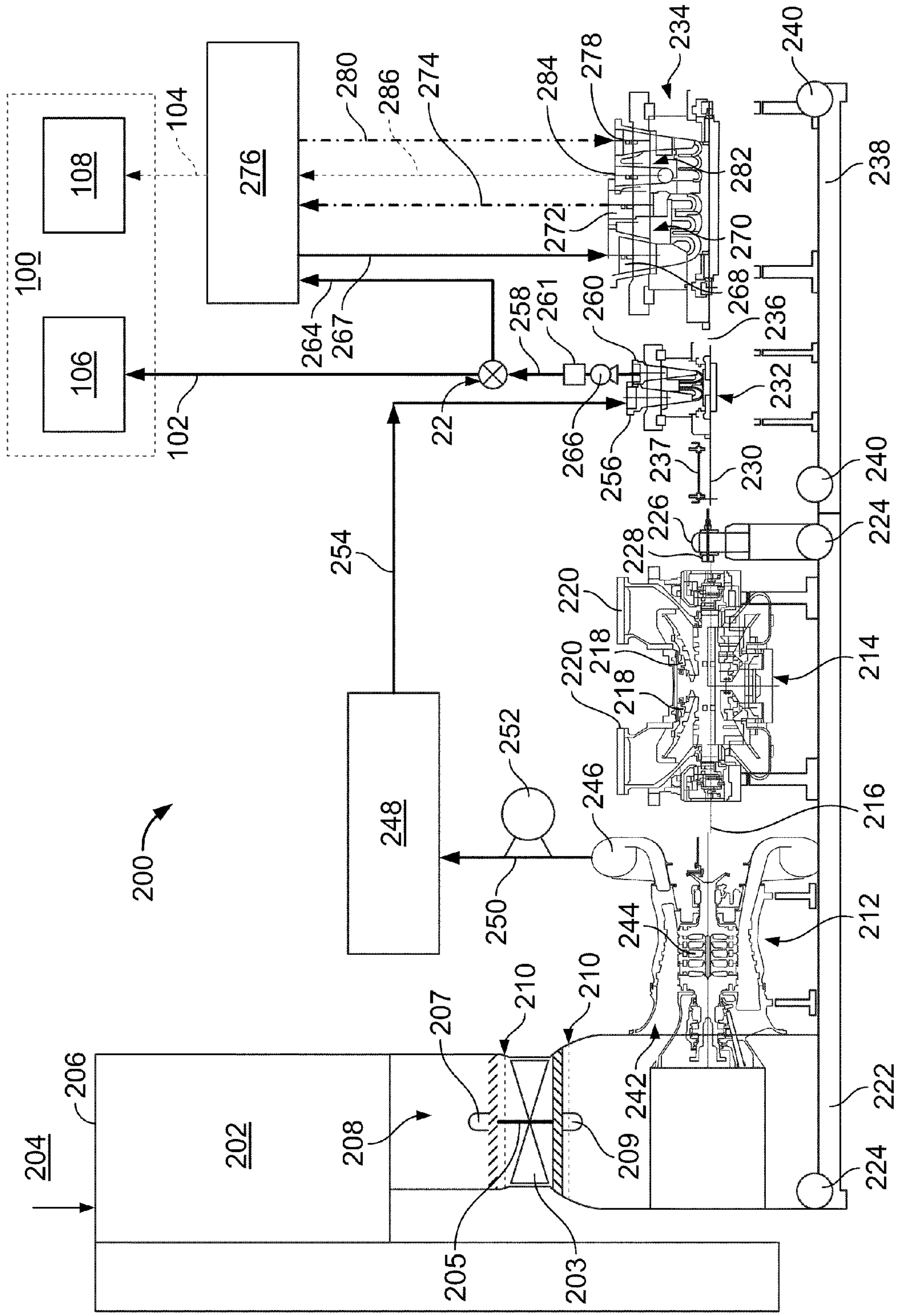
FIG. 2 is a schematic side view of an exemplary compression system that may be used with the industrial facility shown in FIG. 1.
Figure 3:
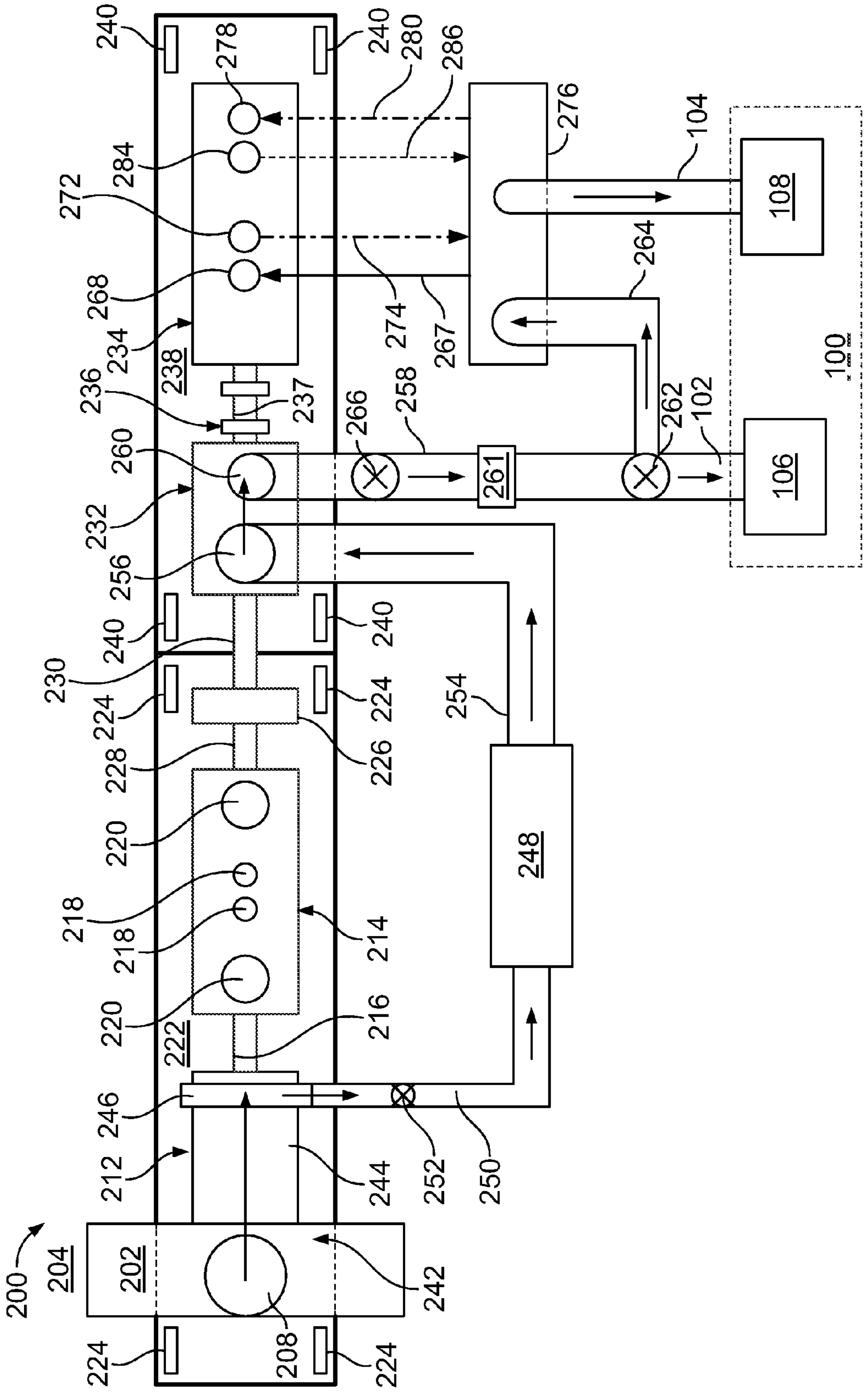
FIG. 3 is a schematic overhead view of the compression system shown in FIG. 2.

Also, in the exemplary embodiment, facility 100 includes a first compressed air receiving apparatus 106 coupled in flow communication with system 200 via conduit 102. Moreover, in the exemplary embodiment, facility 100 includes a second compressed air receiving apparatus 108 coupled in flow communication with system 200 via conduit 104. In a variety of embodiments, apparatus 106 and 108 are heat exchangers, filters, storage tanks and any other device that facilitates operation of facility 100 and system 200 as described herein FIG. 2 is a schematic side view of exemplary compression system 200 that may be used with industrial facility 100. FIG. 3 is a schematic overhead view of compression system 200. System 200 includes an inlet filter housing 202. Housing 202 includes filtration media (not shown) of an appropriate filtration level such that particles of a predetermined size and quantity are substantially prevented from passing through housing 202. Moreover, the filtration media is selected for the particular processing or industrial plant that might be utilizing compression system 200. Housing 202 pulls in air from an atmospheric environment 204 via a filter inlet 206.

System 200 also includes a supercharging device 208 coupled in flow communication with filter housing 202. Device 208 is a pressure-enhancing device that increases air pressure from an ambient pressure of approximately 1.01 bar (14.7 psia) by approximately 1% to 5%. In the exemplary embodiment, device 208 is a rotary device, for example a fan 203, that is rotatably coupled to and driven by a plurality of electric motor drives 207 and 209 via a shaft 205. Alternatively, device 208 is driven by a single motor. Also, alternatively, device 208 is rotatably coupled to and driven by a turbine (not shown) as disclosed in, for example, but not limited to, U.S. Pat. No. 6,530,224 B1, assigned to General Electric Company, Schenectady, N.Y.

Increasing the air pressure near inlet 206 facilitates increasing an air flow rate throughout system 200. Parameters associated with device 208 selected to facilitate operation of system 200 as described herein include, but are not limited to, size, number, rotational velocity, pressure increase, and power draw. In the exemplary embodiment, device 208 is mounted vertically in housing 202 to mitigate gravitational forces that may induce a bowing force in shafts (not shown) associated with driving devices 207 and 209 that are rotatably coupled to device 208, and shaft 205 of device 208. Moreover, mounting device 208 and its associated drive devices 207 and 209 with a vertical orientation offers a further advantage of using a plurality of fairings 210 in line with air flow streams (not shown) being channeled through housing 202. Such fairings 210 facilitate improving aerodynamic characteristics of the air exiting device 208. Alternatively, device 208 is mounted with any orientation that facilitates operation of system 200 as described herein.

In other alternative embodiments, methods that include, but are not limited to, water injection and evaporative cooling systems are used in conjunction with or in lieu of device 208 to facilitate increasing the efficiency and effectiveness of system 200 as described herein. Such methods are disclosed in, for example, but not limited to, U.S. Pat. No. 6,484,508 B2, assigned to General Electric Company, Schenectady, N.Y. In further alternative embodiments, methods that include, but are not limited to, chiller systems are used in conjunction with or in lieu of device 208 to facilitate increasing the efficiency and effectiveness of system 200 as described herein. Such methods are disclosed in, for example, but not limited to, U.S. Pat. No. 6,058,695 B2, assigned to General Electric Company, Schenectady, N.Y.

System 200 also includes a first compression apparatus that, in the exemplary embodiment, is referred to herein as a main air compressor (M.A.C.) 212. Specifically, M.A.C. 212 is a low pressure axial compressor (LPC) that is any suitably sized compressor section associated with any of GE's product line of heavy duty gas turbine engines. Such gas turbine engine compressor sections may be modified for any particular air compression system demands. Alternatively, any compression apparatus that facilitates operation of system 200 as described herein is used. In the exemplary embodiment, system 200 further includes a driver 214 rotatably coupled to M.A.C. 212 via a shaft 216. Specifically, driver 214 is a GE dual flow steam turbine engine with a plurality of steam inlet ports 218 and a plurality of steam exhaust ports 220. Alternatively, driver 214 is any turbo-drive device of appropriate nameplate/design power output that facilitates operation of system 200 as described herein. Also, alternatively, driver 214 is any drive device that facilitates operation of system 200 as described herein, including, but not limited to, electric motors. In the exemplary embodiment, shaft 216 includes a coupling (not shown) that is used to couple driver 214 to M.A.C. 212 at a factory or shop, wherein the coupling may be aligned and permanently and/or rigidly fixed on a first base plate 222 (discussed further below). Alternatively, shaft 216 includes any type of coupling that facilitates assembly and operation of system 200 including, but not limited to, a rigid and flexible coupling. Moreover, alternatively, driver 214 is coupled to M.A.C. 212 in the field and aligned and rigidly fixed at a field installation site.

M.A.C. 212 and driver 214 are securely coupled, or mounted, to a first modular skid, platform, or first base plate 222. First base plate 222 facilitates modular assembly of at least a portion of system 200 by enabling prefabricated assembly in a factory or shop prior to shipment to the field. First base plate 222 also facilitates shipping at least a portion of system 200 from the factory or shop to the field by at least partially defining size and weight limits of equipment that includes, but is not limited to M.A.C. 212 and driver 214. Moreover, first base plate 222 facilitates shipping by decreasing the number of equipment moves associated with M.A.C. 212 and driver 214. Limiting equipment size and weight and mitigating a number of equipment moves each facilitate reducing costs of shipping and installation. In the exemplary embodiment, M.A.C. 212 and driver 214 are oriented on first base plate 222 such that field inspection and maintenance activities are facilitated. First base plate 222 includes a plurality of lifting lugs 224 fixedly coupled to first base plate 222. Lugs 224 are sized and oriented to facilitate moving first base plate 222 with components including M.A.C. 212 and driver 214 secured to first base plate 222.

Driver 214 is configured to drive equipment on each end. This configuration facilitates horizontal mounting of system 200's compression equipment described herein. Such horizontal mounting decreases capital procurement and construction costs associated with an associated building, or vertical structure for housing system 200 since vertical support structures are not needed. This configuration also facilitates using driver 214 to drive the coupled air compression apparatus at speeds sufficiently high enough to facilitate use of small and lighter compression apparatus.

In the exemplary embodiment, driver 214 is coupled to a gear box 226 via a shaft 228 that includes a rigid coupling (not shown). Alternatively, shaft 228 includes any coupling sized and designed to facilitate operation of system 200 as described herein. Also, in the exemplary embodiment, gear box 226 includes a plurality of step-up gears (not shown). Gear box 226 receives a rotational input speed induced by shaft 228 and increase that speed such that a rotational output speed of a gear box output shaft 230 is greater than the input speed. Gear box 226 is secured to first base plate 222.

Gear box 226 is rotatably coupled to an intermediate air compressor (I.A.C.) 232 via shaft 230. In the exemplary embodiment, I.A.C. 232 is a GE Nuovo Pignone, two-stage, centrifugal air compressor. Alternatively, I.A.C. 232 is any compressor that is sized and matched to facilitate operation of system 200 as described herein. Similarly, in the exemplary embodiment, I.A.C. 232 is coupled to a boost air compressor (B.A.C.) 234 via a shaft 236. Alternatively, gearbox 226 is mounted between I.A.C. 232 and B.A.C. 234, wherein a range of rotational speeds of I.A.C. 232 is substantially similar to the rotational speed range of steam turbine engine driver 214. In the exemplary embodiment, B.A.C. 234 is a GE Nuovo Pignone, six-stage, centrifugal air compressor. Alternatively, B.A.C. 234 is any compressor that is sized and matched to facilitate operation of system 200 as described herein. Also, in the exemplary embodiment, shaft 230 includes a flexible coupling 237. Further, in the exemplary embodiment, shaft 236 includes a flexible coupling (not shown). Alternatively, shafts 230 and 236 include any couplings that facilitate operation of system 200 as described herein.

In the exemplary embodiment, I.A.C. 232 and B.A.C. 234 are rotatably coupled to each other and secured to a second modular skid, platform, or base plate 238, in the factory or shop. Second base plate 238 includes a plurality of lifting lugs 240. Moreover, base plate 238 has similar benefits as first base plate 222. Furthermore, first base plate 222 and base plate 238 are oriented to facilitate a single rotatable field coupling and alignment between gear box 226 and I.A.C. 232 via flexible coupling 237, thereby facilitating decreasing installation times and costs. Platforms 222 and 238 are securely coupled to each other to mitigate misalignments within system 200 due to vibration or other causes. The orientation of equipment as illustrated in the exemplary embodiment, that is, securely coupling M.A.C. 212, drive 214 and gear box 226 to first modular first base plate 222 and I.A.C. 232 and B.A.C. 236 to second modular base plate 238 may be adjusted as necessary in alternative embodiments to facilitate equipment weights, sizes and other alignment parameters.

M.A.C. 212 includes an inlet portion 242 coupled in flow communication with device 208, wherein portion 242 receives air at a pressure that is somewhat higher than nominal atmospheric pressure due to a small pressure increase from device 208. M.A.C. 212 also includes a plurality of stages 244 coupled in flow communication with portion 242 that cooperate with an exit volute 246 to facilitate forming a M.A.C. discharge air stream (not shown) of elevated pressure. System 200 includes a heat exchanger 248 coupled in flow communication with volute 246 via a conduit 250 and a first anti-surge device 252. In the exemplary embodiment, heat exchanger 248 is a tube and shell heat exchanger sized to reduce the compressed air stream temperatures to predetermined ranges prior to admission into I.A.C. 232. Also, in the exemplary embodiment, device 252 is a variable bleed valve. Alternatively, heat exchanger 248 and device 252 are any models of heat exchanger and anti-surge device, respectively, that facilitate operation of system 200 as described herein.

Heat exchanger 248 facilitates decreasing compressed air temperature to a typical level shown exiting heat exchanger 248 thus facilitating a reduction in the power requirements necessary in the next compression section, that is, I.A.C. 232. In an alternative embodiment, heat extracted from heat exchanger 248 is integrated into operation of any facility using compression system 200, such operation includes, but is not limited to, steam formation or other heating needs.

Heat exchanger 248 is coupled in flow communication with I.A.C. 232 via a conduit 254. Conduit 254 channels a cooled air stream (not shown) to an I.A.C. inlet portion 256. I.A.C. 232 forms a pressurized air stream (not shown) and discharges the stream into a conduit 258 via an I.A.C. outlet portion 260. In some embodiments, a secondary heat exchanger 261 is positioned downstream of outlet portion 260. Heat exchanger 261 facilitates cooling the pressurized air stream to facilitate reducing a design power requirement associated with driving B.A.C. 234 and/or facilitating operating within a temperature range defined by components downstream of conduit 102, including, but not limited to, air receiving apparatus 106.

System 200 also includes a three-way flow control valve 262 coupled in flow communication with I.A.C. outlet portion 260 via conduit 258, wherein valve 262 is configured to split the air stream discharged from I.A.C. 232 into two air streams. First air supply conduit 102 is coupled in flow communication with valve 262 and is configured to channel a first air stream (not shown) at a first predetermined air pressure to first air receiving apparatus 106 within industrial facility 100. In the exemplary embodiment, the first air pressure is selected to be compatible with low pressure applications that include, but are not limited to, portions of air separation units and pressurized air storage.

System 200 further includes a conduit 264 and a second anti-surge device 266 that is substantially similar to first anti-surge device 252. Devices 252 and 266 are positioned and configured to cooperate to mitigate over-pressurization and compressor surge within system 200 due to operational transients that could lead to piping rupture or hardware failure. Specifically, first device 252 is oriented close enough to M.A.C. 212 to facilitate venting substantially an entire volume of pressurized air upstream of M.A.C. 212 in conjunction with a volume of air downstream of M.A.C. 212 up to I.A.C. 232. Second device 266 is oriented within conduit 258 between secondary heat exchanger 261 and outlet portion 260 to facilitate venting substantially an entire volume of pressurized air within system 200 between I.A.C. 232 and device 266 as well as substantially an entire volume of pressurized air downstream of device 266.

A B.A.C. inter-and after-cooling heat exchanger 276 is coupled in flow communication with valve 262 via conduit 264. Heat exchanger 276 receives at least a portion of the pressurized air stream from I.A.C. 232, removes at least some heat from the air stream and discharges a cooled air stream 267 to B.A.C. 234.

B.A.C. 234 includes an inlet portion 268 that is coupled in flow communication with heat exchanger 276 and receives cooled air stream 267. B.A.C. 234 also includes a first compression section 270 that includes the first three of six stages within B.A.C. 234. Section 270 is coupled in flow communication with portion 268 and an intermediate extraction portion 272 and discharges an air stream 274 to B.A.C. inter-and after-cooling heat exchanger 276. Heat exchanger 276 is coupled in flow communication with portion 272 and a second compression section suction portion 278. Heat exchanger 276 receives air stream 274, removes at least some heat from air stream 274 and discharges a cooled air stream 280 to suction portion 278. Suction 278 is coupled in flow communication with a second compression portion 282 that includes the final three stages of B.A.C. 234, which in turn is coupled in flow communication with a final discharge portion 284. Portion 284 is coupled in flow communication with heat exchanger 276. Portion 284 forms an air stream 286 that is channeled to heat exchanger 276 for final cooling. Heat exchanger 276 is coupled in flow communication with second air supply conduit 104 and channels the second air stream (not shown) to second air receiving apparatus 108 within industrial facility 100.

An exemplary method of assembling fluid compression system 200 includes securely coupling at least one first compression apparatus, that is, M.A.C. 212, to first modular first base plate 222. The method also includes securely coupling at least one drive apparatus, or driver 214, to one of first modular first base plate 222 and second modular base plate 238. The method further includes coupling first modular first base plate 222 to second modular base plate 238.

In operation, housing 202 pulls air from atmospheric environment 204 via filter inlet 206. Device 208 increases air pressure from an ambient pressure of approximately 1.01 bar (14.7 psia) by approximately 1% to 5%. Fairings 210 facilitate improving aerodynamic characteristics of the air exiting device 208.

Driver 214 receives steam via inlet ports 218, extracts energy from the steam as is known in the art, and exhausts depleted steam through ports 220. Driver 214 rotatably drives shaft 216 that subsequently rotatably drives M.A.C. 212. Driver 214 also rotatably drives gear box 226 via shaft 228. Gear box 226 receives a rotational input speed induced by shaft 228 and increases that speed such that a rotational output speed of gear box output shaft 230 is greater than the input speed. Gear box 226, in turn, rotatably drives I.A.C. 232 via shaft 230 and flexible coupling 237, and drives B.A.C. 234 via shaft 236.

M.A.C. 212 inlet portion 242 of M.A.C. 212 receives air from device 208. Inlet portion 242 channels air to plurality of stages 244 that cooperate with exit volute 246 to facilitate forming the M.A.C. discharge air stream. The air stream is channeled to heat exchanger 248 via conduit 250 and first anti-surge device 252.

Heat exchanger 248 removes heat from the air stream and conduit 254 channels a cooled air stream to I.A.C. inlet portion 256. I.A.C. 232 receives the cooled air stream and forms a pressurized air stream. The pressurized stream is discharged into conduit 258 via I.A.C. outlet portion 260.

The pressurized stream is channeled to valve 262 via conduit 258, heat exchanger 261 and device 266. Heat exchanger 261 removes at least some heat from the air stream channeled within conduit 258. Valve 262 splits the air stream discharged from I.A.C. 232 into two air streams. The first air stream is channeled to first air supply conduit 102 which subsequently channels the first air stream to first air receiving apparatus 106 within industrial facility 100. Another air stream is channeled to heat exchanger 276 via conduit 264.

Inlet portion 268 receives cooled air stream 267 from heat exchanger 276 and channels air to first compression section 270 that partially compresses air and channels the air to intermediate extraction portion 272 which discharges air stream 274 to B.A.C. inter-and after-cooling heat exchanger 276. Heat exchanger 276 receives air stream 274, removes at least some heat from air stream 274 and discharges cooled air stream 280 to suction portion 278. Suction 278 channels air to second compression portion 282 that compresses the air and channels it to final discharge portion 284. Portion 284 forms air stream 286 that is channeled to heat exchanger 276 for final cooling. Heat exchanger 276 removes heat from stream 286 and channels stream 286 to second air supply conduit 104 which subsequently channels the second air stream to second air receiving apparatus 108 within industrial facility 100.

The method and apparatus for compressing gases as described herein facilitates operation of production facilities that include air compression systems. Specifically, air compression systems as described herein facilitate operation of industrial facilities. More specifically, the modular platforms facilitate assembly of the air compression system by facilitating prefabricated assembly in a factory or shop prior to shipment to the field. The modular platforms also facilitate shipping at least a portion of the system from the factory or shop to the field by at least partially defining size and weight limits of the equipment that is secured to the platforms. Moreover, the platforms facilitate shipping by decreasing the number of equipment moves associated with the equipment that is secured to the platforms. Limiting equipment size and weight and mitigating a number of equipment moves facilitate reducing costs of shipping and installation. Also, the equipment may be oriented on the platforms such that field inspection and maintenance activities are facilitated. Furthermore, the platforms are oriented to facilitate a single rotatable field coupling and alignment between the two modular platforms, thereby facilitating a decrease of installation times and costs. Also, this configuration facilitates horizontal mounting of the system's compression apparatus, thereby decreasing capital procurement and construction costs associated with an associated vertical structure for housing the system. Furthermore, orienting the equipment such that a high-speed driver rotatably drives all of the compression apparatus facilitates decreasing the size and weight of the compression apparatus.

Exemplary embodiments of air compression as associated with industrial facilities are described above in detail. The methods, apparatus and systems are not limited to the specific embodiments described herein nor to the specific illustrated air compression systems and industrial facilities.

While the invention has been described in terms of various specific embodiments, those skilled in the art will recognize that the invention can be practiced with modification within the spirit and scope of the claims.

What is claimed is:

1. A modular compression system comprising:

an inlet filter housing;

at least one supercharging device coupled to said inlet filter housing such that said at least one supercharging device is positioned substantially within said inlet filter housing;

at least one first compression apparatus coupled to a first platform that is substantially planar; and at least one second compression apparatus coupled to a second platform that is substantially planar, said at least one second compression apparatus is coupled in series flow communication with said at least one first compression apparatus, said at least one supercharging device is coupled in series flow communication with said at least one first compression apparatus and said at least one second compression apparatus.

2. A modular compression system in accordance with claim 1, wherein said at least one supercharging device comprises one of:

at least one motor driver; and at least one turbine driver.

3. A modular compression system in accordance with claim 1 further comprising an evaporative cooling system coupled in series flow communication with said at least one first compression apparatus and at least one second compression apparatus.

4. A modular compression system in accordance with claim 1 further comprising a chilling system coupled in series flow communication with said at least one first compression apparatus and at least one second compression apparatus.

5. A modular compression system in accordance with claim 1 wherein said first platform and said second platform are coupled to each other.

6. A modular compression system in accordance with claim 5 further comprising:

a first portion of said modular compression system coupled to said first platform, wherein said first portion comprises said at least one first compression apparatus and at least one first shaft rotatably coupled to said at least one first compression apparatus; and a second portion of said modular compression system coupled to said second platform, wherein said second portion comprises said at least one second compression apparatus and at least one second shaft rotatably coupled to said at least one second compression apparatus, wherein said at least one second shaft is rotatably coupled to said at least one first shaft.

7. A modular compression system in accordance with claim 6 wherein said first portion of said modular compression system further comprises at least one steam turbine engine rotatably coupled to said first compression apparatus.

8. A modular compression apparatus in accordance with claim 7 wherein said at least one steam turbine engine is rotatably coupled to said at least one second compression apparatus.

9. A modular compression system in accordance with claim 8 wherein said at least one second compression apparatus comprises at least one third compression apparatus rotatably coupled to said at least one second compression apparatus and said at least one steam turbine engine.

10. A modular compression system in accordance with claim 9 wherein said at least one second compression apparatus is coupled in series flow communication with said at least one third compression apparatus.

11. A modular compression system in accordance with claim 9 wherein said at least one second compression apparatus is coupled in series flow communication with a first portion of a fluid receiving apparatus, wherein the at least one second compression apparatus is configured to form a first fluid stream having a first pressure.

12. A modular compression system in accordance with claim 11 wherein said at least one third compression apparatus is coupled in series flow communication with a second portion of said fluid receiving apparatus, wherein the at least one third compression apparatus is configured to form a second fluid stream having a second pressure, wherein the second pressure is greater than the first pressure.

13. An industrial facility comprising:

at least one compressed gas receiving apparatus; and at least one modular compression system coupled in series flow communication with said at least one compressed gas receiving apparatus, wherein said at least one modular compression system comprises:

an inlet filter housing;

at least one supercharging device coupled to said inlet filter housing such that said at least one supercharging device is positioned substantially within said inlet filter housing;

at least one first compression apparatus coupled to a first platform that is substantially planar; and at least one second compression apparatus coupled to a second platform that is substantially planar, said at least one second compression apparatus is coupled in series flow communication with said at least one first compression apparatus, said at least one supercharging device is coupled in series flow communication with said at least one first compression apparatus and said at least one second compression apparatus.

14. An industrial facility in accordance with claim 13 wherein said first platform and said second platform are coupled to each other.

15. An industrial facility in accordance with claim 14 further comprising:

a first portion of said modular compression system coupled to said first platform, wherein said first portion comprises said at least one first compression apparatus and at least one first shaft rotatably coupled to said at least one first compression apparatus; and a second portion of said modular compression system coupled to said second platform, wherein said second portion comprises said at least one second compression apparatus and at least one second shaft rotatably coupled to said at least one second compression apparatus, wherein said at least one second shaft is rotatably coupled to said at least one first shaft.

* * * * *